United States Patent Office 3,658,779
Patented Apr. 25, 1972

3,658,779
POLYMERIZATION PROCESS AND CATALYST
Gerald R. Kahle and Lawrence M. Fodor, Bartlesville, Okla., assignors to Phillips Petroleum Company
No Drawing. Filed July 14, 1970, Ser. No. 54,841
Int. Cl. C08f 1/56, 3/10
U.S. Cl. 260—93.7
6 Claims

ABSTRACT OF THE DISCLOSURE

Use of a bicyclic [2.2.2]octane adjuvant of the formula

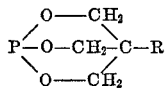

wherein R is selected from the group consisting of H, a halogen and a hydrocarbon radical having from 1 to 20 carbon atoms for a binary polymerization catalyst system containing a complex of the formula $TiCl_3 \cdot \frac{1}{3} AlCl_3$ and at least one compound of the formula $R'_n AlX_{3-n}$ wherein R' is alkyl, aryl, cycloalkyl or combinations thereof having up to 20 carbon atoms, X is a halogen, and n is 2 or 3, results in the increased production of polymers of 1-olefins having an acceptable flexural modulus and lower xylenes-solubles content.

---

This invention relates to the polymerization of olefins to form solid polymers. In one aspect it relates to improved catalysts for such a polymerization. In another aspect it relates to a process for increasing the production of solid polymers of olefins having high flexural modulus and low xylenes-solubles content.

Polymers of alpha-olefins, particularly of propylene, have long been known, and numerous procedures have been disclosed for their production. These polymers are characterized by a greater or lesser degree of stereo-specificity and the presence of a certain amount of a crystalline component. Many of the useful properties of these polymers, such as ultimate tensile, hardness, range of melting temperature, etc., appear to depend upon the crystallinity of the polymer. Flexural modulus, a property readily measurable by standard procedures, provides a reliable and consistent means for characterizing these polymers. The higher the crystallinity of a polymer, the higher the flexural modulus values are found to be. For a commercially attractive product, flexural modulus values must be high, preferably above 200,000 p.s.i. Heretofore it has frequently been necessary to extract amorphous fractions of the polymer in order to provide products having flexural moduli in this range. It is therefore highly desirable to minimize the production of amorphous polymer, as measured for example by the amount of polymer soluble in mixed xylenes. It is further desirable that the productivity of the modified catalyst system not be adversely affected by the addition of the adjuvants which are employed to improve the polymer properties, and it is even more desirable that productivity of an acceptable polymer be increased over that obtained through use of a conventional binary catalyst system.

An object of this invention is to provide an improved process for the production of olefin polymers. Another object of the invention is to provide a polymerization process in which there is obtained an increase in productivity and a decrease in the xylenes-soluble content of the polymer. A further object is to provide a novel catalyst system which when employed in a polymerization process results in an improvement in productivity and xylenes-soluble content of the resulting polymer.

Other aspects, objects and the several advantages of this invention will be apparent to those skilled in the art from a consideration of this disclosure.

According to our invention, we have discovered that increased productivity of 1-olefin polymers can be obtained with high flexural modulus and decreased xylenes-soluble content when the polymerization is conducted in the presence of an organometal modified catalyst system formed by admixing (A) an organoaluminum compound of the formula $R'_n AlX_{3-n}$ where R' is alkyl, cycloalkyl, aryl or combinations thereof having up to 20 carbon atoms, X is a halogen and n is 2 or 3, (B) a titanium trichloride-aluminum trichloride complex resulting from the reaction of titanium tetrachloride and aluminum and having the approximate formula $TiCl_3 \cdot \frac{1}{3} AlCl_3$, and (C) a bicyclic [2.2.2]octane adjuvant of the formula

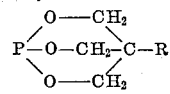

wherein R is selected from the group consisting of H, a halogen and a hydrocarbon radical having from 1 to 20 carbon atoms.

The term "hydrocarbon radical" as used herein is intended to include alkyl, cycloalkyl, and aryl radicals as well as various mixed radicals such as alkaryl, aralkyl, alkylcycloalkyl, cycloalkylaryl, and the like, having up to 20 carbon atoms.

The compounds represented by the formula $R'_n AlX_{3-n}$ and utilized as component (A) of the catalyst system are well known in the art. Examples are triethylaluminum, diethylaluminum chloride, and the like. Mixtures of any of the defined components can also be employed in this process.

The titanium chloride-aluminum chloride complex utilized as component (B) of the catalyst system according to this invention is also well known in the art. It can be formed by reacting titanium tetrachloride with metallic aluminum. The complex can be represented by the formula $TiCl_3 \cdot \frac{1}{3} AlCl_3$.

The polymerization reaction is carried out either in a mass system—i.e., the liquid propylene acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. Where an inert diluent is used, the volume ratio of diluent to propylene is in the range of 1:1 to 10:1, preferably 3:1 to 7:1.

The polymerization is conducted at any suitable temperature, preferably in the range of 0° to 250° F. and more preferably 100° to 200° F. The pressure is sufficient to maintain the reaction mixture substantially in the liquid phase. The reaction time is in the range of one minute to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene and the like. Mixtures can also be used, if desired.

Examples of suitable adjuvants having the formula as above defined are:

4-ethyl-2,6,7-trioxa-1-phospha-bicyclo[2.2.2]octane
4-phenyl-2,6,7-trioxa-1-phospha-bicyclo[2.2.2]octane
4-benzyl-2,6,7-trioxa-1-phospha-bicyclo[2.2.2]octane
4-cyclohexyl-2,6,7-trioxa-1-phospha-bicyclo[2.2.2]octane
4-n-eicosyl-2,6,7-trioxa-1-phospha-bicyclo[2.2.2]octane
and the like.

Broad and preferred ranges for the molar ratio of the catalyst components are:

| | |
|---|---|
| Broad | 0.5:1 to 10:1 |
| Preferred | 1:1 to 7.5:1 |

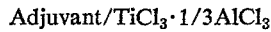

| | |
|---|---|
| Broad | 0.01:1 to 10:1 |
| Preferred | 0.05:1 to 1:1 |

The total catalyst concentration is usually in the range of 0.005 to 10 weight percent of the olefin being polymerized, but concentrations outside this range are operative.

Hydrogen, in suitable and known concentrations, preferably between about 0.08 and 1 mole percent of the propylene calculated as the amount present in the liquid phase, can also be employed to control the molecular weight of the polymer. The tough, strong polymers formed by the process of this invention have wide application in contemporary plastics technology as is well known to the art.

The application of the process of this invention is demonstrated by the following example, although it is not intended that the invention be limited thereto.

EXAMPLE

In a series of runs, propylene was polymerized in a 1-liter stirred reactor at 130° F. and 300 p.s.i.g. pressure. A total of 250 g. of propylene, 1 liter of hydrogen (equivalent to 0.67 mole percent hydrogen of the propylene present in the reaction system), and the amounts indicated of catalysts and adjuvants were charged to the reactor. Reaction time was 2.5 hours. At the end of the reaction, the polymerization mixture was cooled, the catalysts were killed with methanol, and impurities were extracted from the polymeric material in a conventional manner with methanol. The polymer was then molded for various tests to evaluate its properties. The following table summarizes the results:

| Run | Mole ratio [a] | | $TiCl_3 \cdot 1/3AlCl_3$ wt. | Catalyst, percent [b] | Flexural modulus, p.s.i.$\times 10^{-3}$ [c] | Xylene-solubles, wt. percent [d] | Melt flow [e] | Productivity,[f] g./g. $TiCl_3 \cdot 1/3AlCl_3$ |
|---|---|---|---|---|---|---|---|---|
| | $R'_nAlX_{3-n}$ | Adjuvant | | | | | | |
| 1 | 6 | 0 | 1 | 0.104 | 217 | 6.3 | 3.99 | 1,025 |
| 2 | 3.8 | 0.10 | 1 | 0.120 | 216 | 4.6 | 0.93 | 1,020 |
| 3 | 6.2 | 0.20 | 1 | 0.107 | 222 | 4.8 | 2.79 | 1,115 |

[a] $R'_nAlX_{3-n}$ was diethylaluminum chloride in all runs. Adjuvant was 4-ethyl-2,6,7-trioxa-1-phospha-bicyclo[2.2.2]octane in all runs.
[b] Based on propylene.
[c] ASTM D 790-61.
[d] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[e] ASTM D 1238-62T (condition "L").
[f] The ratio of recovered polymer to 1 gram of $TiCl_3 \cdot 1/3AlCl_3$.

The above data show that polypropylene is obtained having a significantly reduced xylenes-soluble content, a high flexural modulus, and productivity rates about equal to or slightly better than untreated catalyst by incorporating the adjuvant of this invention into the catalyst system.

Reasonable variations and modifications of this invention can be made, or followed, in view of the foregoing disclosure, without departing from the spirit or scope thereof.

We claim:

1. A catalyst system formed on admixing (A) a compound of the formula $R'_nAlX_{3-n}$ wherein R' is alkyl, cycloalkyl, aryl or combinations thereof having up to 20 carbon atoms, X is a halogen and n is 2 or 3, (B) a titanium trichloride-aluminum trichloride complex having the approximate formula $TiCl_3 \cdot 1/3AlCl_3$, and (C) a bicyclic-[2.2.2]octane adjuvant of the formula

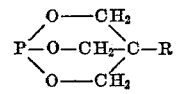

wherein R is selected from the group consisting of H, a halogen and a hydrocarbon radical having from 1 to 20 carbon atoms and wherein the molar ratio of (A) to (B) is in the range of 0.5:1 to 10:1 and the molar ratio of (C) to (B) is in the range of 0.01:1 to 10:1.

2. A catalyst system according to claim 1 wherein (A) is diethylaluminum chloride and (C) is 4-ethyl-2,6,7-trioxa-1-phospha-bicyclo[2.2.2]octane.

3. A process which comprises polymerizing an aliphatic 1-olefin having from 3 to 8 carbon atoms per molecule in the presence of a catalyst which forms on mixing (A) a compound of the formula $R'_nAlX_{3-n}$ wherein R' is alkyl cycloalkyl, aryl or combinations thereof having up to 20 carbon atoms, X is a halogen and n is 2 or 3, (B) a titanium trichloride-aluminum trichloride complex having the approximate formula $TiCl_3 \cdot 1/3AlCl_3$, and (C) a bicyclic[2.2.2]octane adjuvant of the formula

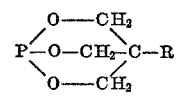

wherein R is selected from the group consisting of H, a halogen and a hydrocarbon radical having from 1 to 20 carbon atoms, and wherein the molar ratio of (A) to (B) is in the range of 0.5:1 to 10:1 and the molar ratio of (C) to (B) is in the range of 0.01:1 to 10:1.

4. A process according to claim 3 wherein (A) is diethylaluminum chloride and (C) is 4-ethyl-2,6,7-trioxa-1-phospha-bicyclo[2.2.2]octane.

5. A process according to claim 3 wherein the polymerization is carried out at a temperature in the range of 0 to 250° F. at a pressure sufficient to maintain the reaction mixture in the liquid phase.

6. A process according to claim 3 wherein hydrogen is present in a concentration of about 0.08 to 1 mole percent of olefin.

References Cited

FOREIGN PATENTS 1,000,348    8/1965    Great Britain.

JOSEPH L. SCHOFER, Primary Examiner

E. J. SMITH, Assistant Examiner

U.S. Cl. X.R.

252—429 B, 429 C; 260—94.9 C, 94.9 E